(12) United States Patent
Floyd (10) Patent No.: US 10,825,340 B1
(45) Date of Patent: Nov. 3, 2020

(54) AUTONOMOUS VEHICLE MANEUVER SYSTEM FOR EMERGENCY VEHICLES AND NON-STANDARD TRAFFIC FLOW

(71) Applicant: STATE FARM MUTUAL AUTOMOBILE INSURANCE COMPANY, Bloomington, IL (US)

(72) Inventor: Matthew L. Floyd, Alpharetta, GA (US)

(73) Assignee: STATE FARM MUTUAL AUTOMOTIVE INSURANCE COMPANY, Bloomington, IL (US)

( * ) Notice: Subject to any disclaimer, the term of this patent is extended or adjusted under 35 U.S.C. 154(b) by 424 days.

(21) Appl. No.: 15/816,373

(22) Filed: Nov. 17, 2017

(51) Int. Cl.
*G08G 1/0965* (2006.01)
*G05D 1/00* (2006.01)
*G05D 1/02* (2020.01)
*G08G 1/0967* (2006.01)

(52) U.S. Cl.
CPC ......... *G08G 1/0965* (2013.01); *G05D 1/0088* (2013.01); *G05D 1/0214* (2013.01); *G05D 1/0276* (2013.01); *G08G 1/096725* (2013.01); *G05D 2201/0213* (2013.01)

(58) Field of Classification Search
CPC .. G05D 1/0088; G05D 1/0276; G05D 1/0214; G05D 2201/0213; G08G 1/0965; G08G 1/096725
See application file for complete search history.

(56) References Cited

U.S. PATENT DOCUMENTS

| | | | |
|---|---|---|---|
| 10,089,876 B1* | 10/2018 | Ramasamy | ............ G08G 1/162 |
| 2014/0091949 A1* | 4/2014 | Tickoo | ............... G01C 21/3492 |
| | | | 340/905 |
| 2015/0243165 A1* | 8/2015 | Elsheemy | ............... B60R 25/00 |
| | | | 340/906 |
| 2018/0012492 A1* | 1/2018 | Baldwin | .......... G08G 1/096783 |
| 2018/0039265 A1* | 2/2018 | Lawler | .................. H04L 67/125 |

\* cited by examiner

*Primary Examiner* — Genna M Mott (74) *Attorney, Agent, or Firm* — Marshall, Gerstein & Borun LLP (57) ABSTRACT

Systems and methods are provided that may to cause autonomous navigation of autonomous vehicles in the case of non-standard traffic flows such as police stops, emergency vehicle passing, construction sites, vehicle collision sites, and other non-standard road conditions. An entity associated with the non-standard traffic flow (e.g., an emergency vehicle, road sign, barrier, etc.) may transmit or broadcast a control signal to be received (or otherwise detected) at one or more autonomous vehicles. Each autonomous vehicle, upon receiving the control signal, may autonomously navigate in accordance with the control signal, thus mitigating or eliminating dangers associated with non-standard traffic flows.

16 Claims, 7 Drawing Sheets

Figure 6

AUTONOMOUS VEHICLE MANEUVER SYSTEM FOR EMERGENCY VEHICLES AND NON-STANDARD TRAFFIC FLOW

FIELD OF THE DISCLOSURE

The present disclosure generally relates to autonomous vehicle navigation. More particularly, the disclosure relates to navigation of autonomous vehicles in atypical traffic environments.

BACKGROUND

An autonomous vehicle (e.g., a self-driving car, bus, truck, etc.) may comprise hardware and/or software modules configured to navigate the autonomous vehicle to a destination, generally according to a preconfigured navigation schema. Such a navigation schema may comprise rules defining the autonomous vehicle's speed, acceleration, hazard detection, navigation of common roads, highways, turns, etc. Thus, autonomous vehicle navigation in standard traffic environments may require little to no intervention on the part of human passengers within the vehicle. However, the presence of emergency vehicles and other non-standard traffic flows may introduce particular complexities above and beyond "standard" vehicle navigation.

A police vehicle, for example, may require a vehicle to quickly but safely pull over to the side of a road in a traffic stop. As another example, an emergency vehicle such as an ambulance require another vehicle (or often, many other vehicles) on the road to yield to the emergency vehicle by moving to the side of the road in a coordinated manner to open a clear lane of passage for the emergency vehicle. Other non-standard traffic flows, such as road construction sites, automobile accident sites, and special case state highway signs, may similarly require non-standard and/or coordinated navigation maneuvers on the part of one or more vehicles. In many jurisdictions, non-emergency vehicles may be required to stop, yield, and/or otherwise respond to such non-standard traffic flows. However, a preconfigured navigation schema of an autonomous vehicle may not reliably anticipate or react to these cases. Further, even if one individual autonomous vehicle may react appropriately to a non-standard traffic flow, a lack of unified coordination between multiple autonomous vehicles on a road may prevent traffic as a whole from properly responding with a non-standard traffic flow.

SUMMARY

Generally, the present disclosure describes systems and methods for controlling navigation of one or more autonomous vehicles in the presence of police vehicles, other emergency vehicles, road construction sites, automobile accident sites, and other non-standard traffic flows, thereby improving the safety of persons associated with the non-standard traffic flows (e.g., police, paramedics, road construction workers, etc.), as well as passengers of the autonomous vehicles themselves.

In one embodiment, a computer-implemented method may be provided for automatically navigating an autonomous vehicle based upon one or more control signals. The method may comprise (1) receiving or otherwise detecting, at a computing device of an autonomous vehicle via one or more processors or sensors, one or more control signals transmitted or broadcasted via an entity associated with a non-standard traffic flow, wherein the one or more control signals indicate at least one of (i) a navigation intent associated with the entity, or (ii) a navigation command for the autonomous vehicle, and (2) automatically controlling, via the one or more processors, autonomous navigation of the autonomous vehicle in accordance with the one or more control signals. The method may comprise additional, alternate, or fewer elements, including those described herein.

In another embodiment, a computer system may be provided, the computer system configured to automatically navigate an autonomous vehicle based upon one or more control signals. The computer system may comprise (1) one or more processors, and (2) one or more computer memories storing a set of computer-executable instructions that, when executed via the one or more processors, cause the computer system to: (i) receive or otherwise detect, via the one or more processors or via one or more sensors, one or more control signals transmitted or broadcasted via an entity associated with a non-standard traffic flow, wherein the one or more control signals indicate at least one of (a) a navigation intent associated with the entity, or (b) a navigation command for the autonomous vehicle; and (ii) automatically control, via the one or more processors, autonomous navigation of the autonomous vehicle in accordance with the one or more control signals. The computer system may include additional, fewer, or alternate components or functions thereof, including those described herein.

In yet another embodiment, a non-transitory computer-readable medium may be provided, the non-transitory computer-readable medium storing non-transitory computer-executable instructions that, when executed via one or more processors of a computing device, cause the one or more processors to automatically navigate an autonomous vehicle based upon a control signal. The non-transitory computer-executable instructions may comprise instructions to (1) receive or otherwise detect, via the one or more processors or via one or more sensors, one or more control signals transmitted or broadcasted via an entity associated with a non-standard traffic flow, wherein the one or more control signals indicate at least one of (i) a navigation intent associated with the entity, or (ii) a navigation command for the autonomous vehicle, and (2) automatically control autonomous navigation of the autonomous vehicle in accordance with the one or more control signals. The non-transitory computer-executable instructions may include additional, fewer, or alternate instructions, including those described herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

Systems and methods are provided for automatic control of autonomous navigation of autonomous vehicles (e.g., self-driving cars, buses, and the like) in the presence of emergency vehicles and other non-standard traffic flows, based upon control signals received via one or more entities associated with non-standard traffic flow (e.g., a police vehicle, ambulance, fire truck or other emergency vehicle, a highway road sign, a road construction sign, etc.).

Generally, the non-standard traffic flow entity may transmit (e.g., to a single target, or to multiple targets each separately) or broadcast (e.g., to some or all targets within a broadcast range) a control signal to an on-board computer system (e.g., autonomous navigation system) of an autonomous vehicle (i.e., one or more autonomous vehicles), the control signal indicating presence of the non-standard traffic flow. In some embodiments, the control signal may indicate one or more of (i) intent of the non-standard traffic flow entity, or (ii) a command for the autonomous vehicle receiving (i.e., receiving or otherwise detecting) the control signal to maneuver in a particular manner. Intent indicated by a control signal may include, for example, a destination, direction of travel, speed, lane preference, etc., of a police vehicle, fire truck, ambulance, or other emergency vehicle transmitting or broadcasting the signal. An indicated command may include, for example, a command that an autonomous vehicle must pull over for a traffic stop, or that the autonomous vehicle must reduce speed and/or yield to a passing emergency vehicle or other upcoming hazard.

In some possible embodiments, a police vehicle (i.e., vehicle associated with and/or used by police or other law enforcement/civil authorities) may transmit a control signal to an autonomous vehicle, the control signal indicating that the autonomous vehicle must pull over to the side of a road (e.g., as part of a routine traffic stop). More specifically, the control signal may indicate that the autonomous vehicle must pull over at a particular geographic point or within a broader geographic area alongside a road (i.e., road, highway, interstate freeway, etc.). Additionally or alternatively, the control signal may indicate that the vehicle must pull over according to one or more criteria (e.g., in a well-lit area, in an area of lighter traffic, along a wide shoulder of a road, or within a particular time allowance). In any case, the control signal, when received at the autonomous vehicle, may cause automatic engagement of autonomous navigation of the autonomous vehicle in accordance with the control signal, thus potentially reducing risks associated with routine traffic stops and other police actions.

In other possible embodiments, an emergency vehicle (e.g., ambulance, fire truck, or police vehicle responding to an emergency) may broadcast or transmit a control signal to an autonomous vehicle (i.e., one or more autonomous vehicles), the control signal indicating the presence and, in some cases, further information (e.g., origin, destination, speed, direction, and/or lane preference) associated with the emergency vehicle. The control signal, when received at the autonomous vehicle, may cause automatic engagement of autonomous navigation of the autonomous vehicle in accordance with the control signal, thereby clearing a path of travel for the emergency vehicle.

In yet other possible embodiments, a non-standard traffic flow entity may be a road construction sign, special case state highway sign, road hazard sign, barrier, or other object associated with a potential hazard, comprising a computing device configured to transmit or broadcast a control signal to an autonomous vehicle (i.e., one or more autonomous vehicle) as the autonomous vehicle approaches and/or passes the object. The control signal may indicate a command for the autonomous vehicle to perform one or more navigation maneuvers (e.g., reduce speed, stop, merge lanes, use a detour route, etc.) to reduce risk associated with a non-standard traffic flow. The control signal, when received at the autonomous vehicle, may cause automatic engagement of autonomous navigation of the autonomous vehicle in accordance with the control signal, thereby reducing risk associated with the object with respect to approaching/passing autonomous vehicles.

In any case, a "control signal" as referred to herein, may comprise one or more signals transmitted (e.g., to a single target, or two multiple targets each separately) or broadcasted e.g., to many or all targets within a broadcast range) via one or more non-standard traffic flow entities, which may include police vehicles, ambulances, fire trucks, other emergency/first responder vehicles, special case state highway signs, road construction signs or barriers, or other entities associated with non-standard traffic flows described herein.

A non-standard traffic flow entity may transmit or broadcast a control signal, for example, via one or more flashing lights (within or outside the visible spectrum) displayed by the entity, via sound wave communications (within or outside of the audible spectrum), via radio frequency communication, cellular data communications, and/or via other means of communication between the non-standard traffic flow entity and the one or more autonomous vehicles. In some embodiments, a non-standard traffic flow entity may transmit a control signal directly to each of one or more autonomous vehicles. Additionally or alternatively, a control signal transmitted via a non-standard traffic flow entity may travel through one or more intermediate entities (e.g., one or more satellites and/or remote servers) before reaching a particular autonomous vehicle. It should be especially noted that combinations of any of the above-described techniques may be used.

The term "autonomous vehicle" will be used herein to refer to one of one or more vehicles receiving (i.e., receiving or otherwise detecting) a control signal transmitted or broadcasted via non-standard traffic flow entities. An autonomous vehicle may be, for example, a partially or fully autonomous (e.g., self-driving) car, truck, bus, or emergency vehicle. Further, the term "emergency vehicle" will be used herein to refer to a vehicle transmitting and/or broadcasting a control signal to an autonomous vehicle. An emergency vehicle may be, for example, an ambulance, fire truck, police vehicle, or some other emergency/first response vehicle. Though the term "autonomous vehicle" will generally be used to refer to vehicle receiving the control signal, it should be appreciated that the emergency vehicle itself may be partially or fully autonomous, wherein a control signal may be generated, transmitted, and/or broadcasted from the emergency vehicle at least partially via autonomous functions, as will be described herein.

Example Environment for Providing a Control Signal to an Autonomous Vehicle

Figure 1:
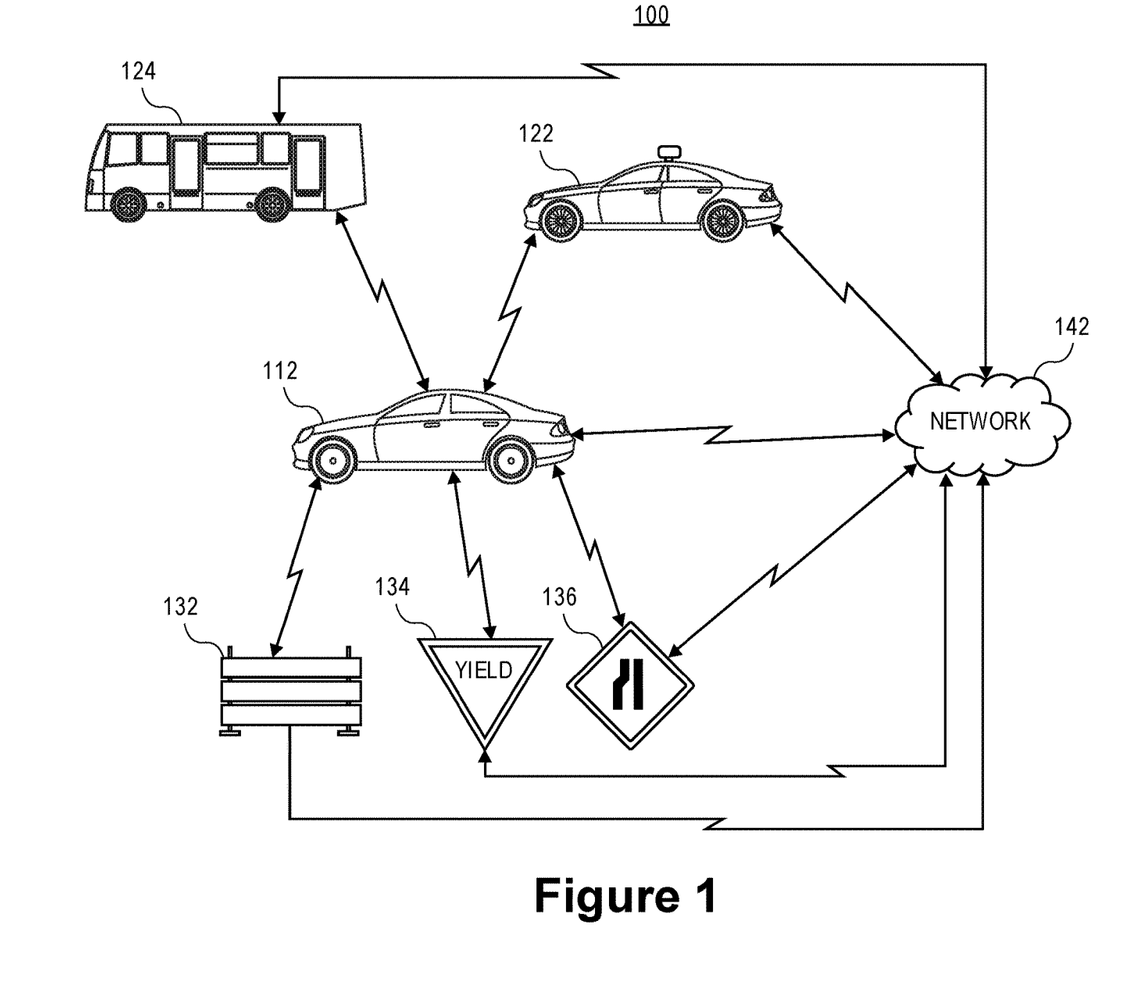
FIG. 1 depicts an example environment for controlling an autonomous vehicle in the case of a non-standard traffic flow.

FIG. 1 depicts an example environment 100 for controlling an autonomous vehicle 112 in the case of a non-standard traffic flow. While one autonomous vehicle 112 is depicted in FIG. 1, it should be appreciated that a plurality of autonomous vehicles 112 are possible (e.g., in an environment wherein control signals are broadcasted to all autonomous vehicles in a traffic flow, or transmitted separately to each autonomous vehicle in the traffic flow).

Generally, the autonomous vehicle 112 may comprise an on-board computer system (e.g., autonomous navigation system) configured to receive (i.e., receive via direct communications, detect via a sensor, etc.) a control signal transmitted via an entity associated with a non-standard traffic flow, and autonomously navigate the autonomous vehicle 112 in accordance with the received control signal. The non-standard traffic flow entity may be, for example, a police vehicle 122, another emergency vehicle (e.g., ambulance, fire truck) 124, a road barrier 132, a road/highway sign 134, or a road construction sign 136. Other non-standard traffic flow entities are possible, and may include any such entities described in this detailed description.

In any case, the non-standard traffic flow entity may be configured to include a computing unit for generating, transmitting broadcasting a control signal to an autonomous vehicle 112. While one autonomous vehicle 112 is depicted in FIG. 1, a plurality of autonomous vehicles 112 may be possible, in some embodiments. Elements of the autonomous vehicle 112 and the non-standard traffic flow entities will be described further with regard to FIG. 2.

In some embodiments, the non-standard traffic flow entity may transmit or broadcast a control signal directly to the autonomous vehicle 112 via wireless data communications (e.g., Wi-Fi, radio frequency transmissions, etc.) directly or via one or more networks 142. The one or more networks may comprise, for example, a proprietary network, a secure public internet, a virtual private network, a satellite communication link, a cellular data network, combinations of these, and/or other types of wired and or wireless networks, where appropriate.

In some embodiments, the non-standard traffic flow entity may transmit or broadcast a control signal in the form of one or more flashing lights emitted from the non-standard traffic flow entity, wherein the one or more flashing lights may be within or outside of the visible light spectrum. Additionally or alternatively, the non-standard traffic flow entity may transmit or broadcast a control signal via a sound emitted from the non-standard traffic flow entity, wherein the sound may be within or outside of the audible spectrum.

In some embodiments, wherein a plurality of autonomous vehicles 112 are present, the control signal, when received by a first autonomous vehicle 112, may cause the first autonomous vehicle 112 to communicate with one or more autonomous vehicles 112 (via any one or more communication means described herein) to facilitate coordinated compliance with the non-standard traffic flow.

Figure 2:
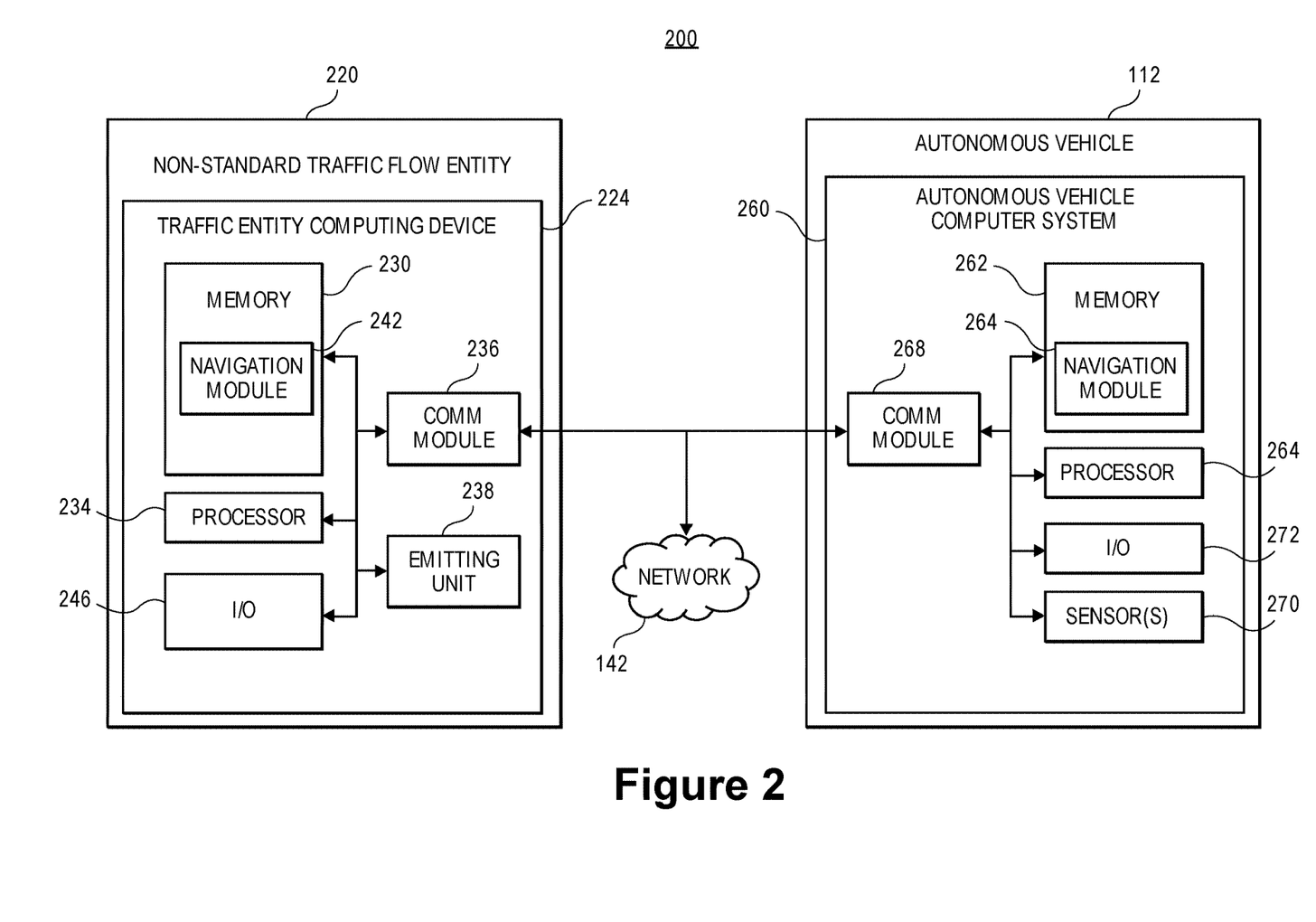
FIG. 2 depicts an example computing environment comprising for controlling an autonomous vehicle in the case of a non-standard traffic flow.

FIG. 2 depicts an example computing environment 200 comprising for controlling an autonomous vehicle in the case of a non-standard traffic flow. Elements of the computing environment 200 generally may correspond to elements of the environment 100 described with regard to FIG. 1.

The environment 200 may include a traffic entity computing device 224, which may be disposed within a non-standard traffic flow entity 220, which may be, for example, any one or more of the non-standard traffic flow entities described with regard to FIG. 1. Generally, the traffic entity computing device 224 may be configured to transmit or broadcast a control signal to one or more autonomous vehicles 112 to automatically control navigation of an autonomous vehicle. It should be appreciated that, while one autonomous vehicle 112 is depicted in FIG. 2, a plurality of autonomous vehicles 112 are possible, in some embodiments.

The traffic entity computing device 224 may comprise a computer memory 230 (i.e., one or more memories). The memory 230 may include ROM, RAM, and/or other types of computer memory, and may include computer-executable instructions to be executed via a processor 234 (i.e., one or more processors). Generally, the computer-executable instructions, when executed via the processor 234, may cause the traffic entity computing device to generate and/or transmit/broadcast a control signal to the autonomous vehicle 112 via a communication module 236 (e.g., a processor, which may be the processor 234) and/or via activation of an emitting unit 238 (i.e., one or more emitting units). The emitting unit 238 may comprise, for example, one or more speakers and/or lights suitable for displaying a control signal to the autonomous vehicle 112 in the form of one or more sounds and/or flashing lights to be detected by the autonomous vehicle 112 (e.g., via one or more sensors).

In some embodiments, the memory 230 may comprise a navigation module 242. Generally, the navigation module 242 may be configured to determine an intent and/or command to be transmitted or broadcasted in the control signal. For example, the navigation module 242, when disposed within a police vehicle, may identify a particular geographic area (e.g., parking lot, low-speed road, low traffic road, wide road shoulder, etc.) suitable for execution of a traffic stop of the autonomous vehicle 112. The identification from the navigation module 242 may cause a control signal to be generated, broadcasted, and/or transmitted by the traffic entity computing device 224, wherein the control signal, upon being received at the autonomous vehicle 112, may automatically cause the autonomous vehicle 112 to autonomously pull over within the identified geographic area.

In some embodiments, the traffic entity computing device 224 may further comprise an input/output unit 246 (i.e., one or more input units (e.g., a keyboard, a touch screen, a microphone, etc.) and/or one or more output units (e.g., a visual display, a speaker, etc.). Generally, the input/output unit 246 may allow a human operator to operate the traffic entity computing device 224 to define one or more criteria for the generation, broadcast, and/or transmission of a control signal. For example, in the police vehicle example described above, the input/output unit 246 may enable a police officer using the police vehicle to identify (e.g., via a "pin drop" on a touch screen) an exact geographic location that the autonomous vehicle 112 must stop to conduct a traffic stop. Additionally or alternatively, in the same example, the input/output unit may enable the police officer to identify one or more other criteria (e.g., "stop within one minute, "do not stop on a major highway," "stop within a zone of under forty miles per hour speed limit," "stop on a road shoulder of width at least ten feet," etc.) according to which the autonomous vehicle 112 must stop. In these embodiments, the navigation module 242 may determine, based upon the one or more criteria supplied by the human operator, the content (e.g., a command) to be included in the control signal. Alternatively, the transmitted and/or broadcasted control signal may indicate the one or more criteria, and a computing element (e.g., navigation module to be discussed herein) of the autonomous vehicle 112 may, upon receiving the control signal, autonomously navigate the autonomous vehicle 112 according to the one or more criteria.

In any case, the input/output unit 246 may, in some embodiments, enable a human operator to identify the particular form in which the control signal will be transmitted and/or broadcasted (e.g., flashing lights via the emitting unit 238, direct communication via the communication module 236 and/or the network 142, a combination of both, etc.).

The autonomous vehicle 112 may comprise an autonomous vehicle computer system 260, which generally may be configured to perform autonomous (i.e., partially or fully autonomous) navigation of the autonomous vehicle 112. The autonomous vehicle computer system 260 may comprise a computer memory 262 (i.e., one or more memories), which may include ROM, RAM, and/or other types of computer memory, and may include computer-executable instructions to be executed via a processor 264 (i.e., one or more processors).

The memory 262 may include a navigation module 264 configured to perform autonomous navigation of the autonomous vehicle 112, including navigation according to a control signal received via a communication module 268 and/or one or more sensors (e.g., sound and/or light sensors) 270. Thus, autonomous navigation of the autonomous vehicle 112 may automatically execute to the control signal transmitted and/or broadcasted via the traffic entity computing device 224 without any intervention required by a driver or passenger within the autonomous vehicle 112, in some embodiments.

The autonomous vehicle computer system 260 may include an input/output unit 272 (i.e., one or more input units (e.g., a keyboard, a touch screen, a microphone, etc.) and/or one or more output units (e.g., a visual display, a speaker, etc.). The input/output unit 272 may, in some embodiments, indicate to passengers within the autonomous vehicle 112 information associated with control signal-based navigation when a control signal is received. For example, a display screen may notify passengers that the autonomous vehicle 112 has received a control signal, has commenced autonomous navigation according to the control signal, and/or has ceased autonomous navigation according to the control signal.

Additional, fewer, or alternate components and/or functions of the computing environment 200 may be possible, in some embodiments.

"Pull Over" Control Signal Via a Police Vehicle

Figure 3:
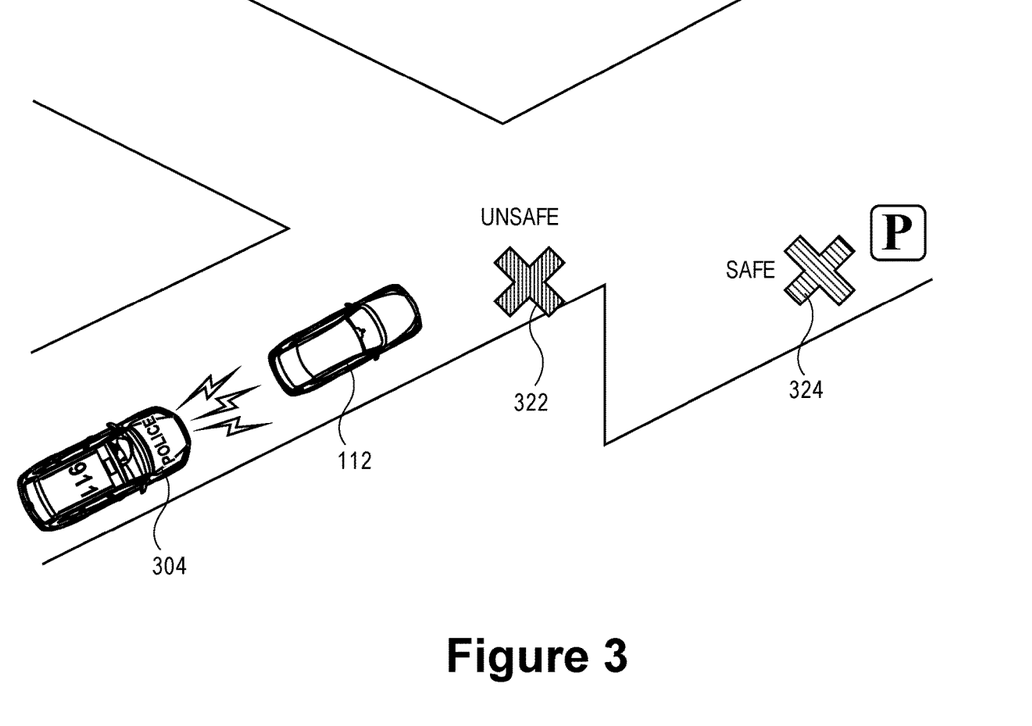
FIG. 3 depicts an example traffic environment comprising a police vehicle pulling over an autonomous vehicle on a road.

FIG. 3 depicts an example traffic environment comprising a police (or other law enforcement) vehicle 304 and an autonomous vehicle (i.e., non-police vehicle) 112 on a road. The police vehicle 304 may comprise some or all of the computing components of the "non-standard traffic flow entity" 220 described with regard to FIG. 2.

Conventionally, a number of significant dangers may emerge when a police vehicle attempts to "pull over" another vehicle, for example as part of a routine traffic stop. For one, the two vehicles themselves, when stopped on or along a busy road (e.g., at the "unsafe" stopping location 322) present an inherent obstacle and potential distraction for other vehicles and drivers along the same road. Additionally, a police officer exiting the police vehicle to approach the other stopped vehicle often must stand directly adjacent to a lane of active traffic, putting the police officer at significant personal risk. Furthermore, the police officer must always be prepared for potential dangers associated with passengers in the other stopped vehicle. Thus, it is usually preferable for the police officer that the other vehicle stop in a less highly trafficked, well-lit location (e.g., along a wide road shoulder, on a side street, in a parking lot, etc.), such as the "safe" location 324 depicted in FIG. 3.

Sometimes, a considerate driver of the other vehicle may attempt to evaluate the risks to the police officer when pulling over. However, the police officer is ultimately the person best trained in police practices, and thus is usually the person most capable of identifying a safe stopping location for both parties. The systems and methods described herein may mitigate the risk to which a police officer may be exposed by allowing the police vehicle 304, and/or a user within the police vehicle 304, to identify a stopping location for an autonomous vehicle 112 in the case of a traffic stop or other police activity.

In some embodiments, the systems and methods herein may enable a user (e.g., police officer) within the police vehicle 304 to identify, via a computing device on-board the police vehicle 304 (e.g., the computing device 224 of FIG. 2), a stopping location (e.g., a geographic area, or a more precise geographic point) at which the user desires the autonomous vehicle 112 to pull over. The on-board computing device may, for example, present to the user a map interface allowing the user to "pin drop" (e.g., point to via a touch screen interaction) a geographic point or area within which the autonomous vehicle 112 must pull over. Additionally or alternatively, the on-board computing device may present to the user an interface allowing the user to identify one or more criteria according to which the autonomous vehicle 112 must pull over. For example, the user may indicate that the autonomous vehicle 112 must pull over within a particular amount of time (e.g., one minute), must exit the current road before pulling over (e.g., by entering a side street or parking lot), must pull over in a well-lit area, must pull over within a particular geographic distance, and/or must perform autonomous navigation according to any other criteria discussed in this detailed description.

In some embodiments, the police vehicle 304 may itself be a partially or fully autonomous vehicle. In these embodiments, the determination of the stopping criteria or stopping location may be made at least partially via autonomous navigation software of the police vehicle 304, based upon known characteristics of local roads, including a priori assessments of roads and/or stopping locations by local law enforcement authorities.

It should be appreciated that combinations of the above techniques may be used to identify a pull over location, in some embodiments. For example, a user may define one or more criteria according to which the autonomous vehicle 112 must pull over, and navigation software on-board the police vehicle 304 may determine a more precise stopping location or area therefrom. Further, determination of a stopping location may rely at least partially upon autonomous navigation software on-board the autonomous vehicle 112 (e.g., wherein the control signal only indicates a general stopping area and/or stopping criteria).

In any case, the computing device on-board the police vehicle 304 may generate a control signal to transmit or broadcast to the autonomous vehicle 112, the control signal generated based upon the determination by the user and/or on-board navigation software. The control signal may be generated in the form of a wireless data communication with the autonomous vehicle 112 and/or in the form of a series of flashing lights or sounds capable of being emitted by the police vehicle 304 and received at the autonomous vehicle 112. In some embodiments, the form of the control signal may be selected by a human operator (e.g., the police officer), or may be determined by autonomous navigation software aboard the police vehicle 304, based upon present road conditions and/or other criteria. Once generated, the control signal may be transmitted and/or broadcasted, to be received by the autonomous vehicle 112.

The autonomous vehicle 112, upon receiving the control signal, may automatically pull over according to the received control signal. If the control signal does not indicate a precise stopping location, autonomous navigation software on-board the autonomous vehicle 112 may determine the precise stopping location in response to receiving the control signal.

Other variations of the techniques described above may be possible, in some embodiments, and may include incorporation of any of the techniques described elsewhere in this detailed description.

"Lane Preference" Control Signal Via an Emergency Vehicle

Figure 4A:
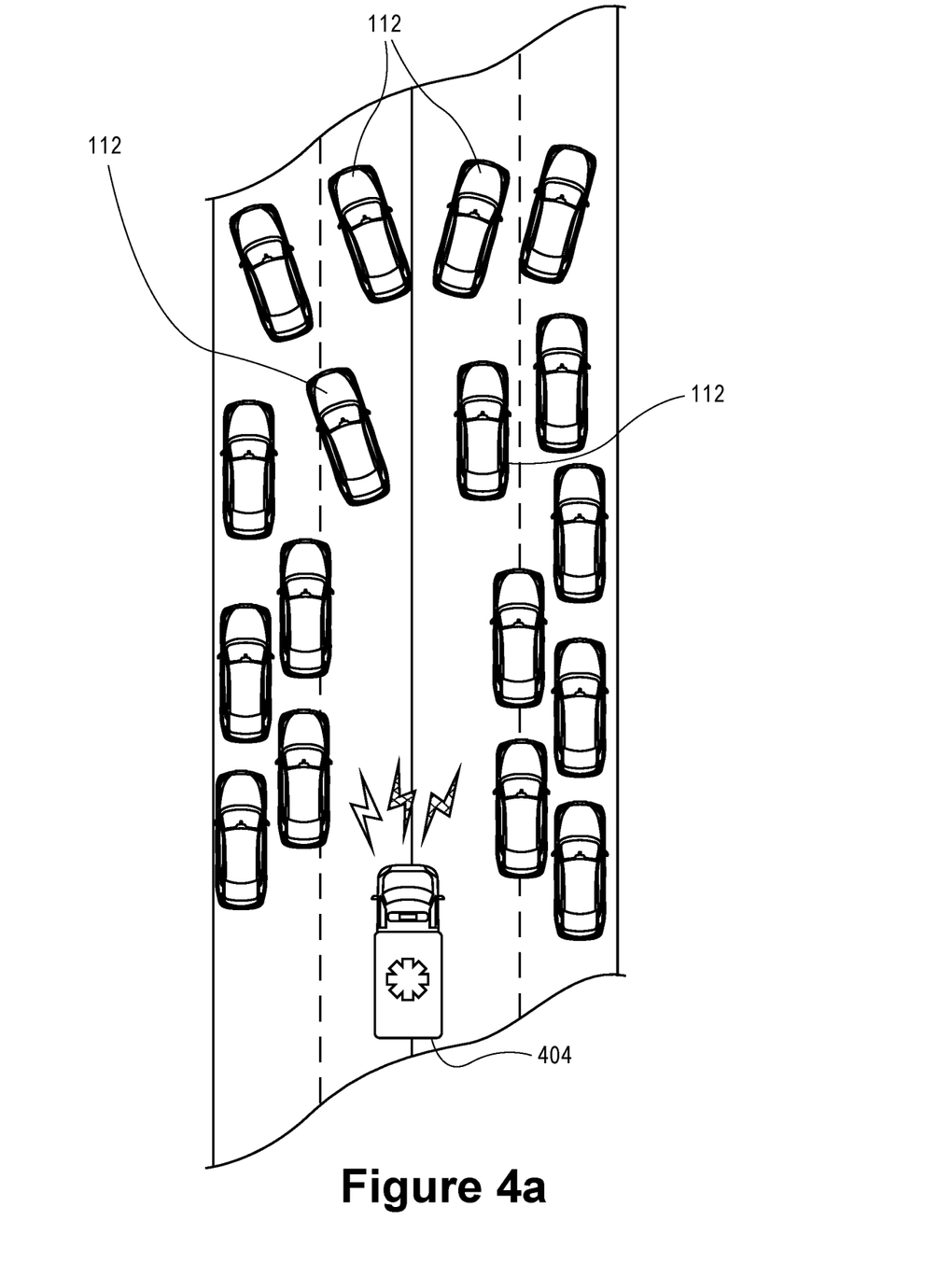
FIGS. 4a and 4b depict an example traffic environment comprising an emergency vehicle passing one or more autonomous vehicles on a road.
Figure 4B:
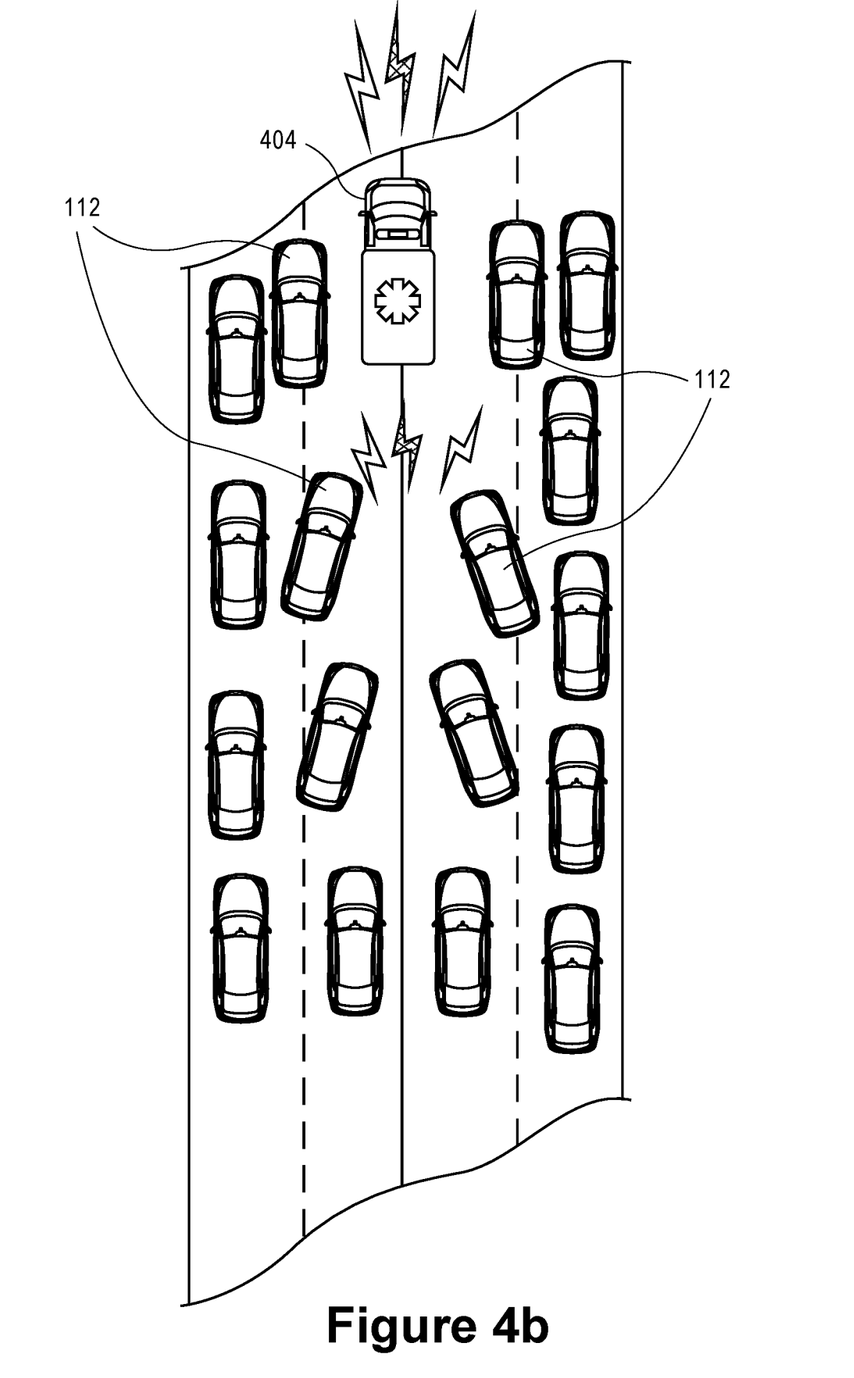

FIGS. 4a and 4b depict an example traffic environment comprising an emergency vehicle 404 (e.g., an ambulance, fire truck, or police vehicle) and autonomous vehicles 112 (i.e., one or more autonomous vehicles) on a multi-lane, one-way road. The emergency vehicle 404 may be, for example, the "non-standard traffic flow entity" 220 described with regard to FIG. 2, and include some or all of the components thereof.

Conventionally, non-emergency vehicles on a road may be required to yield to emergency vehicles responding to an emergency. Usually, each vehicle driver may act individually, maneuvering with the intention of opening a road lane in which the emergency vehicle appears to be traveling. However, the lane intent of a fast-approaching emergency vehicle may be difficult for other drivers to predict. Further, because no one driver can reasonably anticipate the maneuvers of every other driver on the road, it is common that a maneuver by one driver may contradict the maneuver of other drivers and thus the movement of the non-emergency vehicles may fail to quickly open a lane of travel for the emergency vehicle.

In some embodiments, the systems and methods herein may enable a driver of the emergency vehicle 404 to transmit or broadcast a control signal to the autonomous vehicles 112, automatically causing each of the autonomous vehicles 112 to maneuver to clear a lane of travel for the emergency vehicle 404.

Referring to FIG. 4a, an emergency vehicle 404 on a multi-lane road is approaching from behind a plurality of (non-emergency) vehicles, at least one or more of which may be autonomous vehicles 112. As can be seen in FIG. 4a, the emergency vehicle 404 appears to be traveling through the center of the road, split between the center two lanes. The autonomous vehicles 112, however, impede the path of travel of the emergency vehicle 404.

In some embodiments, the systems and methods herein may enable an operator (e.g., driver or passenger) of the emergency vehicle 404 to identify, via a computing device on-board the emergency vehicle 404 (e.g., the computing device 224) to indicate a desired path of travel (e.g., lane preference) for the emergency vehicle 404. The on-board computing device may, for example, present to the operator a map interface allowing the operator to select (e.g., via a touch screen interaction) a lane preference (i.e., a desired lane by which the emergency vehicle 404 will pass the autonomous vehicles 112).

In some embodiments, the emergency vehicle 404 may itself be a partially or fully autonomous vehicle. In these embodiments, autonomous navigation software on-board the emergency vehicle 404 may identify (e.g., determine or suggest to the operator) the lane preference. Combinations of the above techniques may be utilized.

In any case, based upon the identification of the desired lane of travel, the emergency vehicle may generate a control signal indicative of the lane preference of the emergency vehicle 404. The control signal may be generated in the form of a direct communication with the autonomous vehicle, and/or in the form of a series of flashing lights or sounds capable of being received or detected at autonomous vehicles 112. In some embodiments, a human operator may select the form of the control signal to be used. Additionally or alternatively, autonomous navigation software aboard the emergency vehicle 404 may select the form of the control signal, based upon present or expected road conditions, and/or other criteria. In traffic environments wherein a large number of autonomous vehicles 112 may be on the road, a broadcast control signal (e.g., one or more flashing lights or sound, or another multicast communication) may be preferable, such that one "lane preference" control signal may reach each and every autonomous vehicle 112 within the range of broadcast.

In some embodiments, the control signal may indicate other information in addition to the lane preference of the emergency vehicle 404. Such other information may include, for example, speed of the emergency vehicle 404, origin and/or destination of the emergency vehicle 404, and/or additional details regarding the emergency vehicle 404 route of travel.

In any case, once the control signal is generated, the emergency vehicle 404 may broadcast and/or transmit the control signal to the autonomous vehicles 112. Each autonomous vehicle 112, upon receiving (e.g., receiving via a communication module, and/or otherwise detecting via a sensor) the control signal, may automatically, autonomously navigate away from the preferred lane (e.g., via autonomous navigation software aboard each autonomous vehicle 112), in accordance with the control signal.

In some embodiments, the emergency vehicle 404 may transmit one or more control signals individually to each of one or more autonomous vehicles 112. In these embodiments, each control signal may indicate separate commands for the respective autonomous vehicle. For example, the emergency vehicle 404 may transmit "move left" and "move right" control signals, respectively, to two autonomous vehicles 112. The two autonomous vehicles, upon receiving the respective control signals, may each move aside, thus helping to clear a lane of travel for the emergency vehicle 404 via the center of the multi-lane road, in this example.

Referring now to FIG. 4b, the same road is depicted, with the emergency vehicle 404 having advanced passed the autonomous vehicles 112 as a result of the control signal and autonomous vehicle navigation.

As the emergency vehicle 404 advances, distance will increase between the emergency vehicle 404 and the autonomous vehicles 112, causing a change in perceived frequency of the control signal from the perspective of each autonomous vehicle 112, pursuant to the Doppler effect. In response to the perceived frequency meeting or passing a predetermined threshold (e.g., a threshold indicated in the control signal, or a threshold determined by the autonomous vehicles 112), navigation of the autonomous vehicles 112 via the control signal may cease, and the autonomous vehicles 112 may revert to previous navigation patterns (e.g., human assisted navigation, and/or autonomous navigation independent of the control signal).

Other variations of the techniques described above may be possible, in some embodiments, and may include incorporation of any of the techniques described elsewhere in this detailed description.

Control Signals Via Road Signs, Barriers, and Other Objects

In some embodiments, other objects associated with non-standard traffic flows (road barriers, road signs, special case highway signs, and road construction signs may employ the techniques described herein to direct autonomous vehicles to avoid road closures, obstacles, or other risks on a road.

Figure 5:
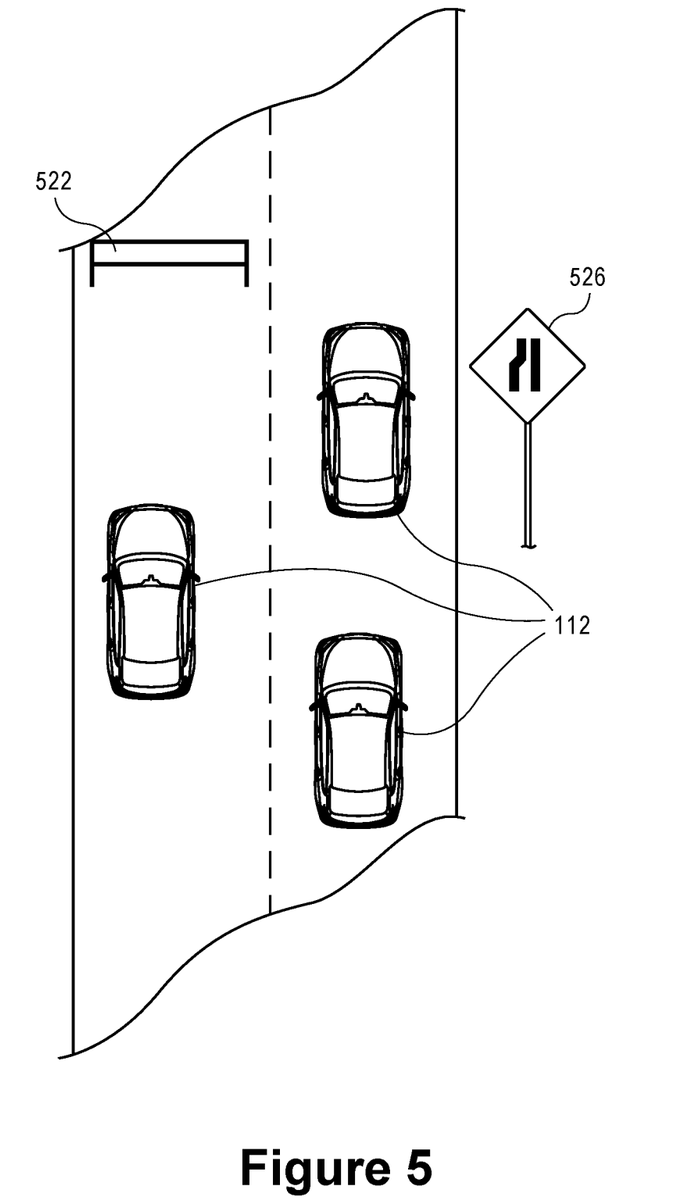
FIG. 5 depicts another example non-standard traffic environment, including a plurality of autonomous vehicles.

FIG. 5 depicts another example non-standard traffic environment, including autonomous vehicles 112 (i.e., one or more partially or fully autonomous vehicles) on a two-lane, one-way road (e.g., an expressway). Ahead of the autonomous vehicles 112, a barrier 522 blocks one lane of the road, reducing the road to just one lane (e.g., due to construction, debris, a vehicle collision, etc.)

Conventionally, lane closures can induce a number of problems on a road. First and foremost, lane closures present a severe risk to vehicle drivers and passengers who do not adhere to posted road signs indicating the lane closure. Additionally, the process of merging heavy traffic from two or more lanes often requires a significant amount of interaction and reduced speed among a plurality of vehicles on the road.

Accordingly, a "merge lane" traffic sign 526 may be placed on the road in advance of the barrier 522, and the traffic sign 526 may be equipped with computing functionality as described herein (e.g., the traffic entity computing device 224 of FIG. 2) to broadcast and/or transmit control signals to autonomous vehicles 112 passing the traffic sign 526 (i.e., approaching the lane closure beginning at the barrier 522). The control signal may, for example, command passing vehicles to reduce speed, move to the right lane, and/or exhibit other cautious navigation behaviors.

In some embodiments, a human operator may preconfigure the control signal to be broadcasted and/or transmitted such that the traffic sign 526 may repeatedly or continuously broadcast and/or transmit the control signal for as long as the barrier 522 remains on the road. The traffic sign 526 may broadcast and/or transmit the control signal in the form of a direct communication with each passing autonomous vehicle 112, in the form of flashing lights, sounds, or any other technique described herein. In high-traffic environments, a broadcast transmission may be preferable, such that every passing autonomous vehicle 112 may reliably receive a same control signal.

In any case, an autonomous vehicle 112 approaches, the autonomous vehicle may receive (e.g., receive via a communication module, and/or otherwise detect via a sensor) the control signal from the traffic sign 526. Receiving the control signal may cause automatic engagement of autonomous navigation functions by the autonomous vehicle 112. Thus, each autonomous vehicle 112 receiving or detecting the control signal may safely move out of lane in which the barrier 522 is ahead.

As each autonomous vehicle advances past the traffic sign 526 and the barrier 522, distance will increase between each respective autonomous vehicle 112 and the traffic sign 526, causing a change in perceived frequency of the control signal from the perspective of the respective autonomous vehicle 112, pursuant to the Doppler effect. In response to the perceived frequency meeting or passing a predetermined threshold (e.g., a threshold indicated in the control signal, or a threshold determined by the autonomous vehicles 112) with respect to a particular autonomous vehicle 112, autonomous navigation of the particular vehicle 112 via the control signal may cease, and the particular vehicle 112 may revert to previous navigation patterns (e.g., human assisted navigation, and/or autonomous navigation independent of the control signal).

While the lane closure example is depicted in FIG. 5, it should be understood that the techniques described herein may be applied to numerous other non-standard traffic flows, including those described in this detailed description.

Other variations of the techniques described above may be possible, in some embodiments, and may include incorporation of any of the techniques described elsewhere in this detailed description.

Example Method for Automatically Navigating Autonomous Vehicle

Figure 6:
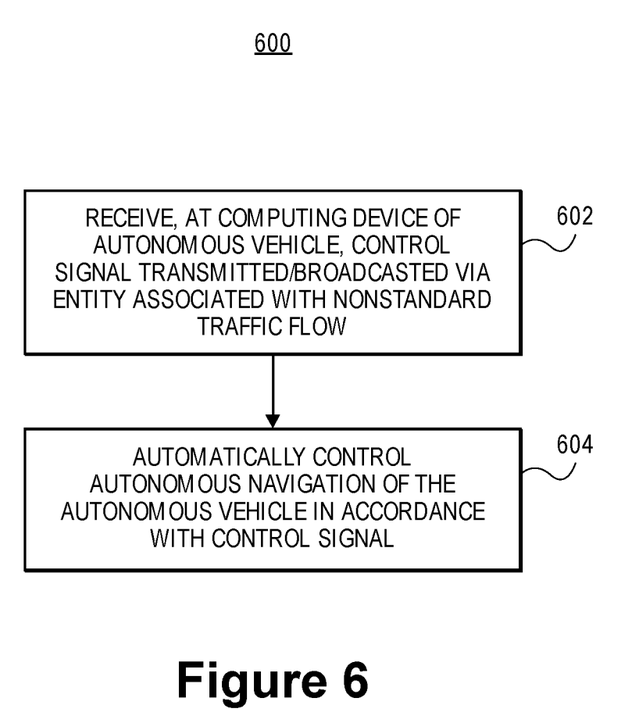
FIG. 6 illustrates an example computer-implemented method for automatically navigating an autonomous vehicle based upon a control signal, in accordance with some embodiments.

FIG. 6 illustrates an example computer-implemented method 600 for automatically navigating an autonomous vehicle based upon one or more control signals, in accordance with some embodiments. The method 600 may be performed, for example, by the autonomous vehicle 112 depicted in FIGS. 1-5. While "an autonomous vehicle" is referred to in the singular in this section, it should be understood that a plurality of autonomous vehicles may perform the method 600.

The method 600 may include receiving or otherwise detecting, at a computing device of an autonomous (i.e., partially or fully autonomous) vehicle via one or more processors and/or sensors (e.g., a communication module, a photosensor, a sound sensor, etc.), one or more control signals transmitted and/or broadcasted via an entity associated with a non-standard traffic flow (602).

The non-standard traffic flow may be, for example, a police traffic stop, a passing of an emergency vehicle, a road construction site, a vehicle collision site, and/or another non-standard traffic flow described in this detailed description. Accordingly, the entity associated with the non-standard traffic flow may be, for example, a police vehicle, another emergency vehicle, a road sign, a road construction sign or barrier, a special case state highway sign, or another entity described in this detailed description.

The one or more control signals transmitted and/or broadcasted by the entity associated with the non-standard traffic flow may generally comprise at least one of (i) one or more navigation intents associated with the entity (e.g., a "lane preference" of an emergency vehicle approaching and/or passing one or more autonomous vehicles), or (ii) one or more navigation command for the autonomous vehicle (e.g., "move left," "move right," "reduce speed by ten miles per hour," "pull over," etc.).

The one or more control signals may be generated, for example, by a human operator (e.g., a police officer, an emergency vehicle driver, etc.), by software (e.g., autonomous vehicle navigation software), and/or by another suitable one or more techniques, including those described in this detailed description. Further, the control signal may be transmitted and/or broadcasted, for example, in the form of one or more flashing lights (within or outside of the visible spectrum), one or more sounds (within or outside the audible spectrum), via Wi-Fi, via radio frequency communications, and/or via other suitable techniques, including those described in this detailed description.

The method 600 may further include automatically controlling, via the one or more processors, autonomous navigation (e.g., via autonomous navigation software on-board the autonomous vehicle) of the autonomous vehicle in accordance with the one or more control signals. In other words, the one or more control signals, when received or otherwise detected at the autonomous vehicle, may cause automatic engagement of autonomous navigation function based at least in part upon the one or more control signals.

In some embodiments, the entity associated with the non-standard traffic flow may be a police vehicle. In these embodiments, the one or more control signals may indicate one or more criteria according to which the autonomous vehicle must stop (e.g., "pull over"). The criteria may include any of the criteria described with regard to FIG. 3 (e.g., a particular geographic point or area to pull over, a time allowance to pull over, etc.). In these embodiments, automatically controlling autonomous navigation of the autonomous vehicle comprises navigating and stopping the vehicle according in accordance with the one or more criteria.

In some possible embodiments, the entity associated with the non-standard traffic flow may be an emergency vehicle (e.g., ambulance, fire truck, or police vehicle) approaching or passing the autonomous vehicle on a road while responding to an emergency situation. In these embodiments, the one or more control signals may indicate a lane preference of the emergency vehicle with respect to the road (e.g., intent of the emergency vehicle to use a left, center, or right lane to approach/pass vehicles). Automatically controlling autonomous navigation of the autonomous vehicle may comprise causing the autonomous vehicle to exit the lane of the road indicated by the lane preference.

In these embodiments, the method 600 may further include determining, via the one or more processors, that the emergency vehicle has met or exceeded a predetermined distance from the autonomous vehicle. The determination may be based at least in part upon an observed frequency of the one or more control signals meeting or passing a predetermined frequency threshold (i.e., as a result of the Doppler effect). The method 600 may further include, in response to the determination that the emergency has met or exceeded the predetermined distance from the entity, ceasing automatic control of autonomous navigation of the autonomous vehicle according to the one or more control signals.

In yet other possible embodiments, the entity associated with the non-standard traffic flow may be a road sign, construction sign, barrier, or state highway sign. In these embodiments, automatically controlling autonomous navigation of the autonomous vehicle comprises causing the autonomous vehicle to exhibit caution with regard to a potential road hazard (e.g., by reducing speed, moving out of a lane containing an upcoming hazard, etc.).

In these embodiments, the method 600 may further include determining, via the one or more processors, that the autonomous vehicle has met or exceeded a predetermined distance from the entity associated with the non-standard traffic flow. The determination may be based at least in part upon an observed frequency (i.e., observed at the autonomous vehicle) of the one or more control signals meeting or passing a predetermined frequency threshold (i.e., as a result of the Doppler effect. The method 600 may further include, in response to the determination that the autonomous vehicle has met or exceeded the predetermined distance from the entity, ceasing automatic control of autonomous navigation of the autonomous vehicle according to the one or more control signals.

The method 600 may include additional, fewer, or alternate actions, including actions described elsewhere in this detailed description.

Additional Considerations

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer" and "insurance provider" may be used interchangeably herein to generally refer to a party or entity (e.g., a business or other organizational entity) that provides insurance products, e.g., by offering and issuing insurance policies. Typically, but not necessarily, an insurance provider may be an insurance company.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f), unless traditional means-plus-function language, such as "means for" or "step for" language, is explicitly recited in the claim(s). The systems and methods described herein are directed to an improvement in computer functionality, and improve the functioning of conventional computers.

What is claimed:

1. A computer-implemented method for automatically navigating an autonomous vehicle based upon one or more control signals, the method comprising:
   receiving or otherwise detecting, at a computing device of an autonomous vehicle via one or more processors or sensors, one or more control signals transmitted or broadcasted via an entity associated with a non-standard traffic flow,
      wherein the one or more control signals indicate at least one of (i) a navigation intent associated with the entity, or (ii) a navigation command for the autonomous vehicle;
   automatically controlling, via the one or more processors, autonomous navigation of the autonomous vehicle in accordance with the one or more control signals;
   determining, via the one or more processors, that the autonomous vehicle has met or exceeded a predetermined distance from the entity associated with the non-standard traffic flow, the determination being based at least in part upon an observed frequency of the one or more control signals meeting or passing a predetermined frequency threshold; and
   in response to the determination that the autonomous vehicle has met or exceeded the predetermined distance from the entity associated with the non-standard traffic flow, ceasing the automatic control of the autonomous navigation of the autonomous vehicle according to the one or more control signals.

2. The computer-implemented method of claim 1,
wherein the entity associated with the non-standard traffic flow is a police vehicle,
wherein the one or more control signals indicate one or more criteria according to which the autonomous vehicle must stop, and
wherein automatically controlling autonomous navigation of the autonomous vehicle comprises navigating and stopping the vehicle in accordance with the one or more criteria.

3. The computer-implemented method of claim 2,
wherein the one or more criteria include a geographic location at which the autonomous vehicle must stop, and
wherein automatically controlling autonomous navigation of the autonomous vehicle comprises navigating the autonomous vehicle to the geographic location and stopping at the geographic location.

4. The computer-implemented method of claim 1,
wherein the entity associated with the non-standard traffic flow is an emergency vehicle approaching or passing the autonomous vehicle on a road,
wherein the one or more control signals indicate a lane preference of the emergency vehicle with respect to the road, and
wherein automatically controlling autonomous navigation of the autonomous vehicle comprises causing the autonomous vehicle to exit the lane of the road indicated by the lane preference.

5. The computer-implemented method of claim 1,
wherein the entity associated with the non-standard traffic flow is a road sign, construction sign, barrier, or state highway sign, and
wherein automatically controlling autonomous navigation of the autonomous vehicle comprises causing the autonomous vehicle to reduce speed or perform a lane change based upon a potential road hazard indicated by the entity.

6. The computer-implemented method of claim 1, wherein the one or more control signals comprise one or more flashing lights emitted via the entity associated with the non-standard traffic flow, and wherein the computing device detects the one or more flashing lights via one or more photosensors.

7. A computer system configured to automatically navigate an autonomous vehicle based upon one or more control signals, the computer system comprising:
one or more processors;
one or more computer memories storing a set of computer-executable instructions that, when executed via the one or more processors, cause the computer system to:
receive or otherwise detect, via the one or more processors or via one or more sensors, one or more control signals transmitted or broadcasted via an entity associated with a non-standard traffic flow,
wherein the one or more control signals indicate at least one of (i) a navigation intent associated with the entity, or (ii) a navigation command for the autonomous vehicle,
automatically control, via the one or more processors, autonomous navigation of the autonomous vehicle in accordance with the one or more control signals;
determine, via the one or more processors, that the autonomous vehicle has met or exceeded a predetermined distance from the entity associated with the non-standard traffic flow, the determination being based at least in part upon an observed frequency of the one or more control signals meeting or passing a predetermined frequency threshold, and
in response to the determination that the autonomous vehicle has met or exceeded the predetermined distance from the entity associated with the non-standard traffic flow, cease the automatic control of the autonomous navigation of the autonomous vehicle according to the one or more control signals.

8. The computer system of claim 7,
wherein the entity associated with the non-standard traffic flow is a police vehicle,
wherein the one or more control signals indicate one or more criteria according to which the autonomous vehicle must stop, and
wherein automatically controlling autonomous navigation of the autonomous vehicle comprises navigating and stopping the vehicle in accordance with the one or more criteria.

9. The computer system of claim 8,
wherein the one or more criteria include a geographic location at which the autonomous vehicle must stop,
and wherein automatically controlling autonomous navigation of the autonomous vehicle comprises navigating the autonomous vehicle to the geographic location and stopping at the geographic location.

10. The computer system of claim 7,
wherein the entity associated with the non-standard traffic flow is an emergency vehicle approaching or passing the autonomous vehicle on a road,
wherein the one or more control signals indicate a lane preference of the emergency vehicle with respect to the road, and
wherein automatically controlling autonomous navigation of the autonomous vehicle comprises causing the autonomous vehicle to exit the lane of the road indicated by the lane preference.

11. The computer system of claim 7,
wherein the entity associated with the non-standard traffic flow is a road sign, construction sign, road barrier, or state highway sign, and
wherein automatically controlling autonomous navigation of the autonomous vehicle comprises causing the autonomous vehicle to reduce speed or perform a lane change based upon a potential road hazard indicated by the entity.

12. The computer system of claim 7, wherein the one or more control signals comprise one or more flashing lights emitted via the entity associated with the non-standard traffic flow, and wherein the computing device detects the one or more flashing lights via one or more photosensors.

13. A non-transitory computer-readable medium storing non-transitory computer-readable instructions that, when executed via one or more processors of a computing device, cause the one or more processors to automatically navigate an autonomous vehicle based upon a control signal, the non-transitory computer readable instructions comprising instructions to:
receive or otherwise detect, via the one or more processors or via one or more sensors, one or more control signals transmitted or broadcasted via an entity associated with a non-standard traffic flow, wherein the one or more control signals indicate at least one of (i) a navigation intent associated with the entity, or (ii) a navigation command for the autonomous vehicle, automatically control autonomous navigation of the autonomous vehicle in accordance with the one or more control signals, determine, via the one or more processors, that the autonomous vehicle has met or exceeded a predetermined distance from the entity associated with the non-standard traffic flow, the determination being based at least in part upon an observed frequency of the one or more control signals meeting or passing a predetermined frequency threshold, and in response to the determination that the autonomous vehicle has met or exceeded the predetermined distance from the entity associated with the non-standard traffic flow, cease the automatic control of the autonomous navigation of the autonomous vehicle according to the one or more control signals.

14. The non-transitory computer-readable medium of claim 13, wherein the entity associated with the non-standard traffic flow is a police vehicle, wherein the one or more control signals indicate one or more criteria according to which the autonomous vehicle must stop, and wherein automatically controlling autonomous navigation of the autonomous vehicle comprises navigating and stopping the vehicle in accordance with the one or more criteria.

15. The non-transitory computer-readable medium of claim 13, wherein the entity associated with the non-standard traffic flow is an emergency vehicle approaching or passing the autonomous vehicle on a road, wherein the one or more control signals indicate a lane preference of the emergency vehicle with respect to the road, and wherein automatically controlling autonomous navigation of the autonomous vehicle comprises causing the autonomous vehicle to exit the lane of the road indicated by the lane preference.

16. The non-transitory computer-readable medium of claim 13, wherein the entity associated with the non-standard traffic flow is a road sign, construction sign, barrier, or state highway sign, and wherein automatically controlling autonomous navigation of the autonomous vehicle comprises causing the autonomous vehicle to reduce speed or perform a lane chance based upon a potential road hazard indicated by the entity.

\* \* \* \* \*